United States Patent [19]
Grube et al.

[11] Patent Number: 5,758,291
[45] Date of Patent: May 26, 1998

[54] METHOD FOR AUTOMATICALLY REVISING A WIRELESS COMMUNICATION UNIT SCAN LIST

[75] Inventors: Gary W. Grube, Palatine; Marc Naddell, Schaumburg; Brian Bunkenburg, Chicago, all of Ill.

[73] Assignee: Motorola, Inc., Schaumburg, Ill.

[21] Appl. No.: 704,402

[22] Filed: Aug. 28, 1996

Related U.S. Application Data

[63] Continuation of Ser. No. 324,958, Oct. 18, 1994, abandoned.
[51] Int. Cl.[6] .................................................. H04Q 7/28
[52] U.S. Cl. ........................ 455/518; 455/521; 455/524
[58] Field of Search ............................... 455/518, 519, 455/520, 521, 517, 524, 525, 432, 433, 435, 436, 437, 438, 439, 440

[56] References Cited

U.S. PATENT DOCUMENTS

| | | | |
|---|---|---|---|
| 4,716,407 | 12/1987 | Borras et al. | 340/825.04 |
| 5,014,345 | 5/1991 | Comroe et al. | 455/54.2 |
| 5,146,538 | 9/1992 | Sobti et al. | 395/2.1 |
| 5,214,790 | 5/1993 | Kozlowski et al. | 455/54.2 X |
| 5,369,783 | 11/1994 | Childress et al. | 455/34.1 X |
| 5,471,646 | 11/1995 | Schultz | 455/54.1 |

*Primary Examiner*—Reinhard J. Eisenzopf
*Assistant Examiner*—Philip J. Sobutka
*Attorney, Agent, or Firm*—George C. Pappas

[57] ABSTRACT

A method for automatically revising (405) a scan list (201–203) in a wireless communication unit (103–106) employs the provision of a scan list that includes talk group identifiers (202) and reception-priority levels (203) associated the talk groups (202). A wireless message (114) that includes a first talk group identifier (116) and a corresponding reception-priority level (117) instructs the receiving communication untis to revise their scan lists to include the first talk group identifier (116) and the corresponding reception-priority level (117).

10 Claims, 5 Drawing Sheets

| SOURCE TALKGROUP | TRIGGER TYPE | TRIGGER CONTENT | TARGET TALKGROUP | OPCODE | TALK GROUP | PRIORITY |
|---|---|---|---|---|---|---|
| SOUTH | SPEECH | "OFFICER DOWN" | NORTH | ADD | SOUTH | 2 |
| EAST | SPEECH | "SITUATION SECURE" | NORTH | DELETE | EAST | 3 |
| NORTH | DATA | "SOUTH LOCATION" | SOUTH | ADD | NORTH | 5 |
| EAST | SPEECH | "HELP" | NORTH | ADD | EAST | 2 |
| EAST | SPEECH | "HELP" | SOUTH | ADD | EAST | 2 |
| -- | -- | -- | -- | -- | -- | -- |
| -- | -- | -- | -- | -- | -- | -- |
| -- | -- | -- | -- | -- | -- | -- |
| -- | -- | -- | -- | -- | -- | -- |

*FIG. 3*

METHOD FOR AUTOMATICALLY REVISING A WIRELESS COMMUNICATION UNIT SCAN LIST

This is a continuation of application Ser. No. 08/324,958, filed Oct. 18, 1994 and now abandoned.

TECHNICAL FIELD OF THE INVENTION

The present invention relates generally to wireless communication systems and in particular, to a method for revising the scan list within wireless communication units.

BACKGROUND OF THE INVENTION

Wireless communication systems are known to include a plurality of communication units, a limited number of wireless communication resources, and a communication resource controller. A typical communication unit, which may be a mobile radio, portable radio, or radio/telephone, offers its user a variety of features, such as group calls (i.e., one-to-many communications), telephone interconnect calls (i.e., one-to-one communications), and data communications. To access one of these services, the user must request access to one of the limited number of wireless communication resources and specify the type of service requested. This request is sent from the communication unit to the communication resource controller via a control channel, wherein the control channel is one of the communication resources that has been selected to function as the control channel. Upon receiving the request, the communication resource controller determines whether the requesting communication unit is authorized to access the requested service and, if so, whether a communication resource is available for allocation. When both conditions are met, the communication resource controller allocates a communication resource to the requesting communication unit, thereby facilitating access to the requested service.

Dispatch communication systems typically employ digital addressing to enable the predetermined partitioning of the communication units into talk groups. Generally, talk groups allow for organization of the communication units into groupings of similar function or geographic affiliation. A talk group call initiated by a requesting member of a talk group results in a one-to-many wireless communication, such that other members of the same talk group will receive the same message simultaneously. Multiple talk group selections are programmed into the communication units to allow the user to select and operate on more than one talk group, however, a typical communication unit supports operation within only a single talk group at any given time. This point is clarified with the following discussion of a communication system feature commonly referred to as "talk group scan."

Talk group scan is employed by a communication unit to display to the user scrollable list that includes secondary talk groups contained within the communication unit—i.e., identities of those talk groups with which the communication unit can presently communicate. Typically, the communication units are associated with a primary/home talk group that reflects its functional or geographic affiliation. The primary/home talk group may be the communication path used to dispatch new assignments to the user, while monitoring secondary scan talk groups may be carried out to merely provide the communication unit user with background information. Today, such information includes an occasional request for assistance from other talk groups across functional or geographic boundaries.

The operation of talk group scan may be best explained by way of example. Suppose talk groups A, B, and C are in the communication unit's scan list (i.e., the communication unit monitors talk group traffic on any of the talk groups A, B or C, one at a time). When talk group A becomes active, the communication unit monitors talk group A. During that time, if talk group B becomes active, the communication unit will only monitor the talk group B traffic once the traffic ends on talk group A. This type of operation is also known as non-priority talk group scan.

Non-priority talk group scan fails to direct a scanning communication unit back to a primary/home talk group in the event that the home talk group becomes active while the unit is monitoring other system traffic. Accordingly, this prior art technique results in certain missed communications. U.S. Pat. No. 4,716,407 issued to Borras et. al., describes a wireless communication system that overcomes this problem by providing so-called priority-monitor operation. Borras teaches transmission of a sub-audible word on the current voice channel, thereby causing the communication unit to revert to the control channel to receive a priority call assignment. To employ this technique, the communication unit must store a table in its memory listing each talk group to be scanned and their respective receive-priority, as known in the art. Of course, this table of scannable talk groups is predetermined, and is therefor limited in terms of flexibility.

Wireless communication systems used in public safety applications are relied upon to provide important communications in various emergency situations such as civil violence, police procedures, and rescue operations. Often, emergency situations require assistance from additional users outside a particular talk group, including units that make up the public safety operation of another area. To carry out this assistance re-assignment, the users from the various other talk groups must communicate on a single common talk group where the current emergency exists. Since many of these emergency events involve life or death situations, it is desired to accomplish this re-assignment automatically and without error. Further, efficiency of dispatch, i.e., the best candidates for reassignment are immediately re-assigned to the talk group in need, would be highly desirable.

The aforementioned priority monitor scheme does not provide an adequate solution, as it allows for collecting only those units having a common priority talk group in their pre-programmed lists. In other words, the communication units must know, prior to the emergency, which talk group they might receive having priority.

Today, dispatchers, or other communication system authority figures, are relied on to first detect an event requiring assistance and then to broadcast a verbal or textual message to all talk groups requesting assistance for the effected talk group. This does not address the aforementioned requirements, as it relies on a human to detect the event, select one or more appropriate talk groups to assist in the emergency and broadcast a message to the selected talk group(s). Further, this solution fails when the communication units in the selected talk group are not pre-programmed with the identities of all target talk groups that might require assistance.

Another solution, described in U.S. Pat. No. 5,014,345, issued to Comroe et. al., provides for a re-programming station to send commands to a communication unit for re-programming the communication unit with a selected talk group. While this provides for the addition of a previously unknown talk group code to a communication unit by way of a wireless command, it does not teach an automatic method of detecting a triggering event and choosing talk groups for assistance. Thus, this solution is also inadequate, as the detection and talk group selection mechanisms are prone to human error.

In yet another prior art system, U.S. Pat. No. 5,146,538, issued to Sobti et. al., discloses a method for a wireless communication unit user to select a target communication unit using the spoken word. Speech recognition is used to select a target user and its communication system identity within the initiating communication unit. For example, the initiator simply says "call Jim" and the initiating communication unit detects "Jim" by comparing the real time speech with pre-stored speech samples. The word "Jim" is then cross-referenced with a communication system identity used in normal signaling to establish a unit-to-unit communication.

While the communication system described in U.S. Pat. No. 5,146,538, teaches a convenient method for detecting a particular predetermined target user of a future communication, it does not teach a method to automatically detect an emergency situation. Further, it does not teach a method of automatically selecting a set of assisting talk groups based on a combination of the identity of the talk group needing assistance and the nature of the emergency. Lastly, it does not teach a method of automatically updating the talk group scan receive priority and talk group entries in a set of one or more assisting talk groups.

Accordingly, a need exists for a method of automatically providing a common communication talk group for assisting users outside of a particular home talk group. Since many emergency events involve life or death situations, it is desired to accomplish this re-assignment automatically without error and efficiently such that the best candidates for reassignment are indeed re-assigned to the particular talk group that has the emergency or situation requiring assistance.

BRIEF DESCRIPTION OF THE DRAWINGS

FIG. 3 illustrates a table within the communication controller, in accordance with the present invention;

DETAILED DESCRIPTION OF A PREFERRED EMBODIMENT

Generally, the present invention provides a method for automatically revising the scan list in a wireless communication unit in response to the detection of a predetermined event, or trigger component. This is accomplished by receiving, at a base site, a wireless message from a source communication unit that includes a predetermined trigger component and an identification of a first talk group to which the source communication unit belongs. Next, the base site analyzes the wireless message to identify the predetermined trigger component. Once this happens, the base site transmits to a plurality of communication units, a wireless command message that includes a second talk group identifier and an instruction to cause recipient communication units to add the second talk group identifier to their scan lists. The recipient communication units then automatically revise their scan lists to include the second talk group identifier and the corresponding reception-priority level. From that point forward, the recipient communication units will be capable of scanning subsequent transmissions from the first talk group.

With such a method, automatic revision of a communication unit scan list is carried out to provide assistance capability for communication units outside of a first talk group. That is, communication units of the first talk group and those outside the first talk group can communicate on a common talk group.

Figure 1:
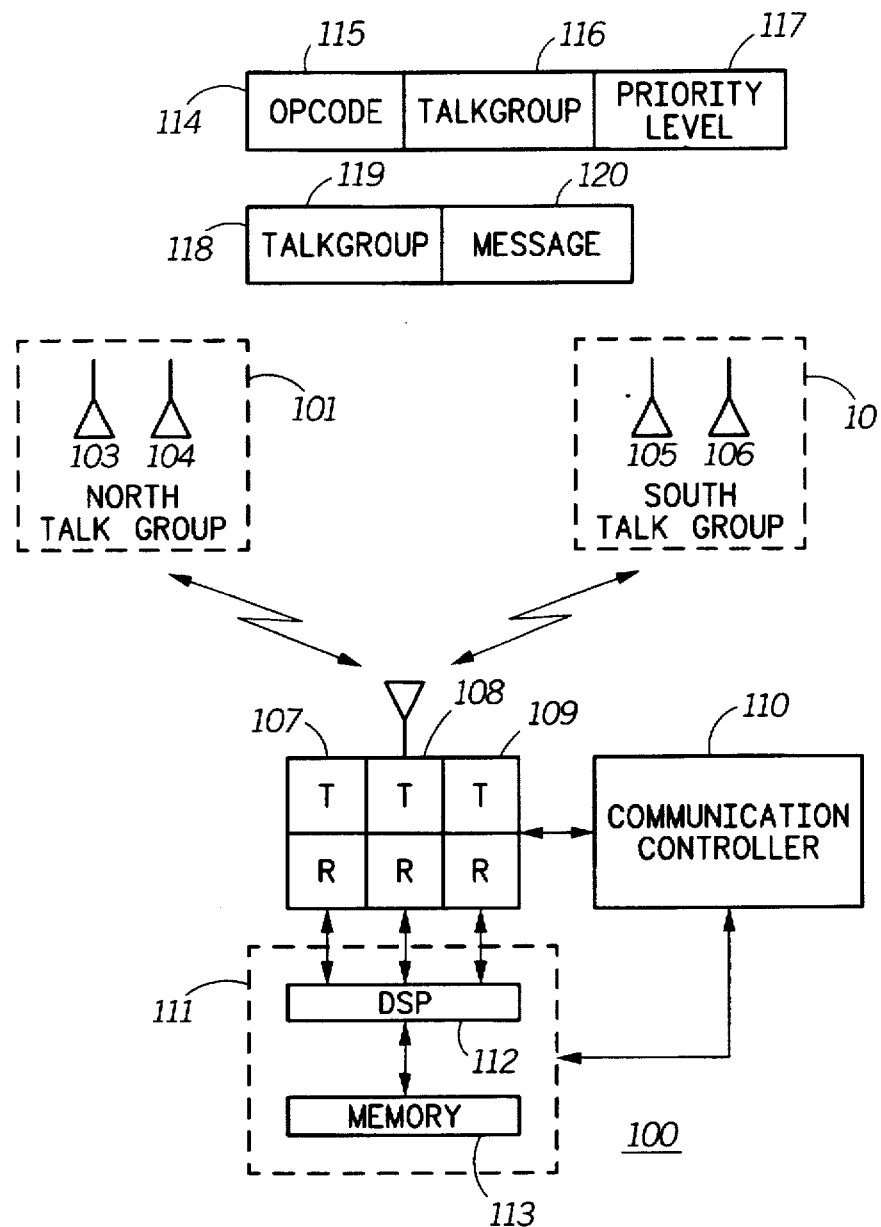
FIG. 1 illustrates a communication environment, in accordance with the present invention.

The present invention can be more fully described with reference to FIGS. 1–5. FIG. 1 illustrates a communication environment 100 that includes communication units 103–104 that constitute a north communication talk group 101 and communication units 105–106 that constitute a south communication talk group 102. The communication system further includes base stations 107–109, a communication controller 110, a trigger detection system 111, including a digital signal processor (DSP) 112, and a memory 113.

The communication units 103–106 transceive information with the base stations 107–109 over a wireless communication path that may comprise a time division multiple access (TDMA) scheme, a frequency division multiple access (FDMA) scheme, or a code division multiple access (CDMA) scheme. Of course, all of these communication schemes are known in the art, so no further discussion of the type of wireless link will be provided. The communication units, which can be MIRS™ portable radios manufactured by Motorola, Inc., provide voice and/or data messages 118 in the form of compressed digital audio and compressed data transfers, respectively. A typical transmission 118 contains a talk group identifier 119 and a message 120. The base stations 107–109, which may comprise MIRS™ base station radios manufactured by Motorola, Inc., transceive RF carriers that are allocated among the communication units 103–106 by the communication controller 110. The base site transmissions 114 comprise several fields, including an opcode 115, a talk group ID 116, and a receive, or reception, priority level 117. Use of these fields is described later.

The communication controller 110, which can be a MIRS™ dispatch application controller (DAP) manufactured by Motorola, Inc., provides the allocation control of a plurality of wireless communication resources 107–109 in response to requests from the communication units 103–106. The communication controller 110 is also operably coupled to the DSP 112 within the trigger detection system 111 to receive trigger detection indications from the DSP 112. The DSP 112, which can be a 560001 manufactured by Motorola, Inc., is operably coupled to the base stations 107–109, to provide a comparison of the received contents of communication unit messages 120 to that of predetermined triggers stored in the memory 113 to produce a trigger indication when a match is made. The memory 113, may be a random access memory (RAM), read only memory (ROM), magnetic storage media, optical storage media, or any other storage type capable of storing a set of predetermined triggers. The predetermined triggers may comprise speech fragments such as single words, phrases, sentences, or even paragraphs. The predetermined triggers may also comprise varying lengths of data strings of text or images.

As earlier stated, the present invention provides a method for automatically revising the scan list in a wireless communication unit in response to the detection of a predetermined trigger component. This is best described by example with reference to FIG. 1. Assume that the north communication unit talk group 101 is active and communication unit 103 is transmitting a transmission 118 to a base station 108. The wireless transmission 118 includes a predetermined trigger component, such as a speech component like "officer down", within a message 120 and an identification of a first talk group 119 (north talk group) to which the source communication unit 103 belongs. Next, the DSP 12 analyzes the message 120 to identify the predetermined trigger component by comparing the message components to the predetermined stored triggers in the trigger detection system 111 memory 113. If this comparison produces a match, then the DSP 112 signals the communication controller 110 with an indication of which trigger was detected and for which source talk group. Next, the communication controller 110 instructs the base stations 107–109 to transmit to the plurality of communication units 103–106, a wireless message 114 that includes a second talk group identifier 116, a receive priority level 117, and an instruction opcode 115 to cause recipient communication units 103–106 to add the second talk group identifier 116 to their scan lists. In this example, the second talk group identifier identifies the north talk group.

Recipient communication units 103–106 automatically revise their scan lists to include the second talk group identifier 116 and the corresponding reception-priority level 117. The scan lists will be discussed in more detail later with reference to FIG. 2. From that point forward, the recipient communication units 103–106 are capable of scanning subsequent transmissions from the first talk group. In this example, the south communication units 105–106 are now able to automatically monitor any subsequent transmissions from the north talk group, so that they can communicate directly with—and thereby provide support for any required assistance to—users of the north communication units.

Figure 2:
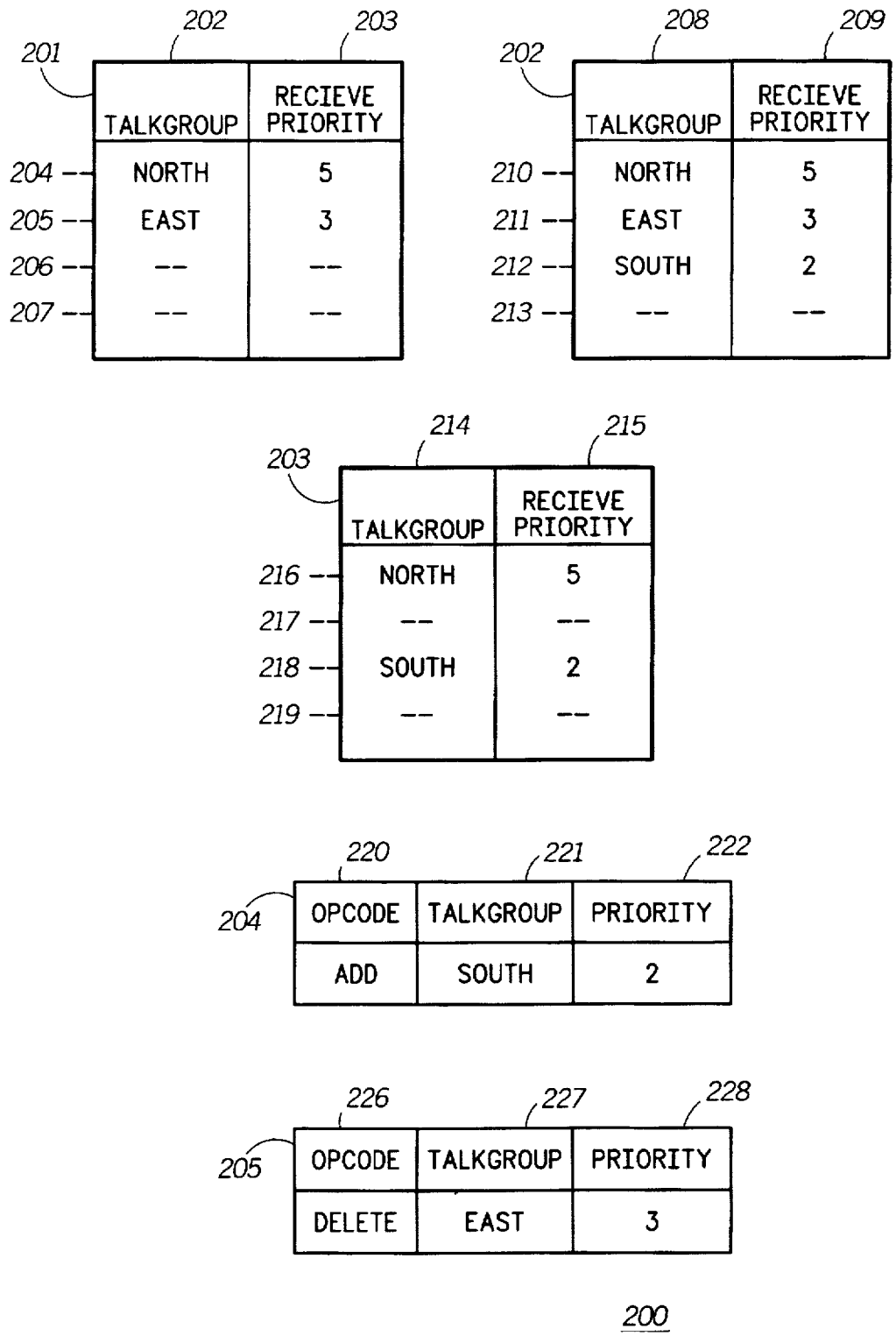
FIG. 2 illustrates scan list tables of a communication unit and wireless messages, in accordance with the present invention.

The revision of the communication unit scan lists can be described by way of illustrating a set of revision commands and the scan list before and after the commands. FIG. 2 illustrates a set of temporal communication unit scan lists 201–203 (in ascending order, related to time advancing), and a set of base site transmissions 204–205 corresponding to the temporal scan list changes 202 and 203, respectively. As shown, the scan lists 201–203 comprise talk group fields 202, 208, 214, and receive priority fields 203, 209, 215, respectively. For each scan list 201–203 there is a corresponding entry number one 204, 210, 216, and a corresponding entry number two 205, 211, 217, and a corresponding entry number three 206, 212, 218, and a corresponding entry number four 207, 213, 219. Those skilled in the art will recognize that the number of scan list entries is a design choice to strike a balance between the users' maximum scan list member requirement, and the processing and memory capabilities of the communication unit.

The talk group entry field 202 contains the talk groups that the communication unit monitors, while the receive priority field determines the sequential order in which the talk groups are monitored. For example, scan list 201 contains an entry 204 for the north talk group to be scanned at a receive-priority level 5, while entry 205 shows the east talk group to be scanned at a receive-priority level 3. (It should be noted that a lower receive-priority number generally relates to more important priority—i.e., to be scanned before talk groups having higher receive-priorities.) The receive-priority level is typically within the range of 1–5, or more. In this example, the communication unit monitors the north talk group, but only if the east talk group is not active. When the east talk group becomes active, the unit leaves the north talk group to monitor transmissions involving the east talk group. A more detailed description of such receive-priority operations may be found in Borras, U.S. Pat. No. 4,716,407, incorporated herein by reference.

In a preferred embodiment, the contents of the communication unit scan lists are dynamically revised in response to commands transmitted from the base site. The base site transmissions 204–205 include opcode fields 220, 226, talk group fields 221, 227, and receive priority fields 222, 228, which together constitute base site commands. The command set of the opcode field includes add and delete. The add command results in adding a new entry, or replacing an existing entry with the same talk group identifier, while the delete command results in deleting an existing entry.

Using FIG. 2, a temporal example of the scan list revisions made in response to the base site commands is hereafter described. An initial—i.e., before revision—scan list 201 contains two talk group entries, one for each of the north and east talk groups. Next, based on the detection of a trigger component in a message from a communication unit within the south talk group, the communication controller determines that the scan lists in the communication units of at least one other talk group should be revised to include the south talk group. To carry this out, a command message 204 is formatted and transmitted from the base site to the communication units. The opcode field 220 contains an add command, the talk group field 221 is set to the south talk group, and the priority field 222 is set to a receive-priority level of two, as shown. Upon receiving this command message 204, the communication unit checks to see if the south talk group is already in the scan list 201. If so, then it simply updates the priority level associated therewith, using the priority level found in the priority field 222. In this example, the south talk group was not in the initial scan list 201, so the communication unit checks to see if there is room left in the scan list to add a new entry. Entries 206 and 207 are both empty in the initial scan list 201, so the communication unit adds the south talk group and its associated receive-priority level (see entry 212 in the first modified scan list 202).

Next, assume for the continuing example that the base site detects a trigger component in a message from a communication unit in the east talk group, such as a speech component "scene secure." In response, the communication controller determines that the scan lists in the communication units of at least one other talk group should be revised to exclude the east talk group, since it is no longer necessary for others outside of the east talk group to monitor those communications. To carry this out, a command message 205 is formatted and transmitted from the base site to the communication units. The opcode field 226 contains a delete command, the talk group field 227 is set to the east talk group, and the priority field 228 is set to a receive-priority level of three, as shown. Upon receiving this command message 205, the communication unit checks to see whether the east talk group is already in the scan list 202. If not, then a fault is flagged resulting, for example, in a message being sent to the system manager. In this example, because the east talk group is found (note entry 211 of scan list 202), the communication unit deletes entry 211, thereby resulting in a null entry 217 in the final scan list 203.

FIG. 3 shows a table 300 used within the communication controller 110 (shown in FIG. 1) to illustrate one embodiment of the present invention. As shown, the table 300 contains a source talk group field 301, a trigger type field 302, a trigger content field 303, a target talk group field 304, an opcode field 305, a talk group field 306, and a receive priority field 307. Each field contains elements, which together constitute table entries 308–312. The table 300 is predetermined and entered by a system manager responsible for maintenance of the communication controller. Using FIGS. 1 and 3, the following example describes how the table elements are used from each entry as the communication controller 110 processes the communication traffic within the communication environment 100. Assume that communication unit 105 transmits a message to members within its south talk group 102, through base station 109. The communication controller 110 searches for the identifier for the south talk group within the source talk group field 301 in table 300. If it is not found, no special action is taken. However if the appropriate identifier is found, as shown in entry 308, then the communication controller 110 issues an instruction to the trigger detection system 111. This instruction directs the trigger detection system 111 to analyze the messages from the south talk group, looking for the trigger content listed in the trigger content field 303 when the incoming messages are of the type shown in the trigger type field 302.

The instruction from the communication controller 110 also includes channel information, which is routed to the trigger detection system 111 so it can monitor the correct base station 109 for communications from the source communication unit 105. Based on entry 308, the communication controller 110 instructs the trigger detection system 111 to search for the two word speech component "officer down", when the message type is speech, for the duration of the message. If this trigger component is not found, then no special action is taken. However, when the "officer down" speech trigger is found within the message 120 from communication unit 105, then the communication controller 110 formats a wireless message 114 for transmission, by the base stations 107–109, to the talk group indicated in the target talk group field 304. In this example, the north talk group 101 receives a message instructing them to "ADD SOUTH TALK GROUP WITH PRIORITY 2", as set forth in fields 305–307 of entry 308 shown in table 300.

After receipt of the message 114, the north communication units 101 automatically monitor (e.g., via priority scan) transmissions from the south communication units 102 at a receive-priority level of two. It is important to note that the talk group field 116 in the scan list revision command 114 is determined from table 300 in the talk group field 306, not from the source talk group. This allows a talk group to be added to a scan list where the added talk group need not be the same as the talk group from which the trigger event was detected. Another trigger component might include a user location, such that when a member of one talk group roams into the location area of another talk group, the latter talk group members monitor communications from the roaming members talk group. As an example, entry 310 illustrates a trigger that may be detected when a member of the north talk group sources a call that includes location data indicating that it has roamed into the south location, thereby triggering a scan list revision command instructing south talk group members to monitor communications on the north talk group. The foregoing examples illustrate a flexible and automatic scan list revision technique that uses a wide array of triggering events and response combinations.

Figure 4:
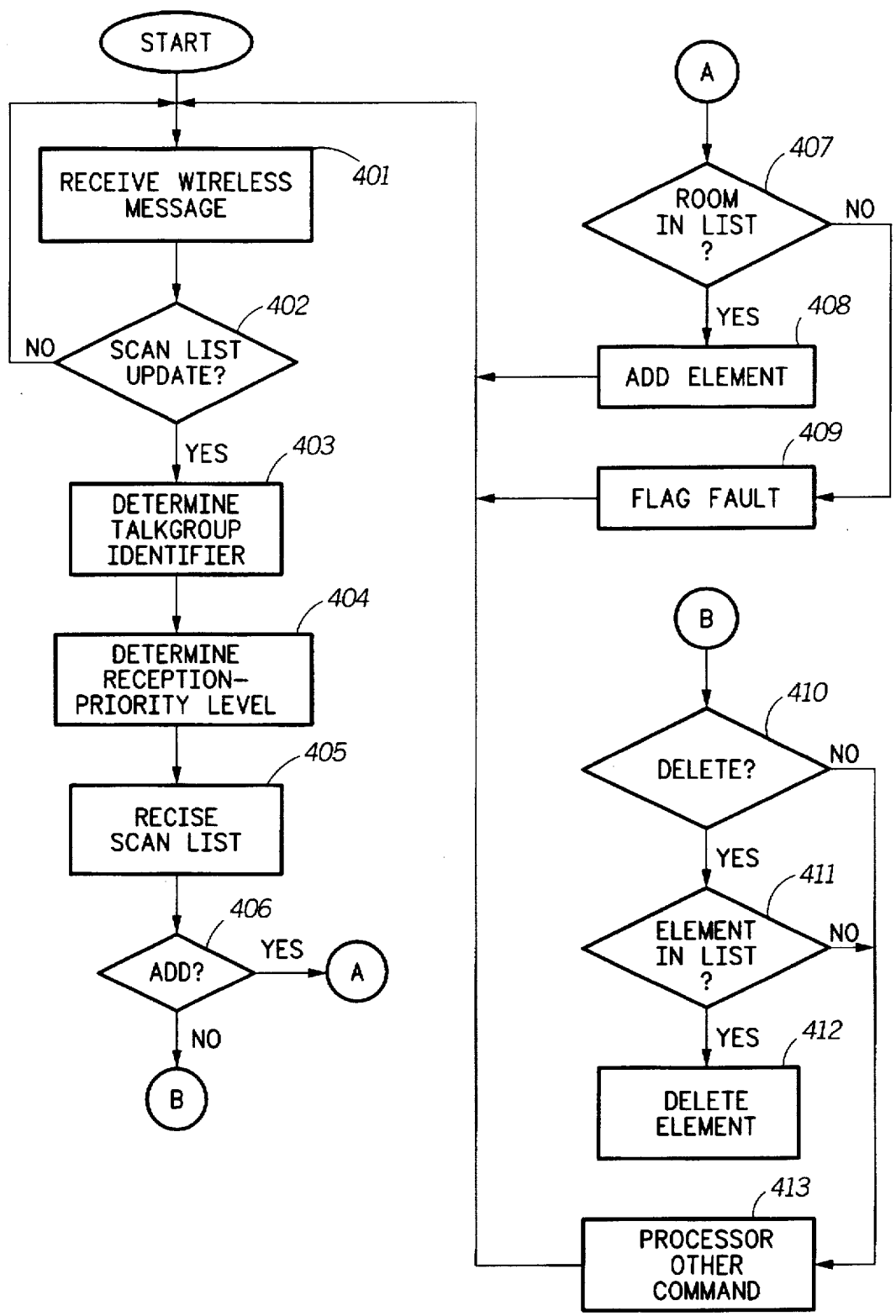
FIG. 4 illustrates a logic diagram depicting operation of a communication unit, in accordance with the present invention.

FIG. 4 illustrates a logic diagram depicting operation of the communication units 103–106, in accordance with the present invention. After the communication unit receives (401) a wireless message from the base site, the message type is checked (402) to determine whether or not the message is a scan list update revision command. If not, no special action is taken and the communication unit continues to receive messages. If the message is a scan list update, the talk group field is read to determine (403) the talk group identifier. The talk group identifier is the talk group identification of a talk group to be added or deleted from the communication unit's scan list. The priority field in the message is then read to determine (404) the receive-priority level. The receive-priority level is used subsequently in the communication unit's scan process to prioritize the order of preference that the communication unit will monitor transmissions. The communication unit's scan list is then revised (405) by inspecting the opcode from the scan list revision command, as next described.

When the opcode indicates (406) an add command, a decision is reached to determine (407) whether there is room in the scan list for a new entry. In addition, if the talk group indicated in the scan list update command is already an entry in the communication unit's scan list, then that entry can be overwritten with the receive-priority level from the scan list update command. If there is room for a talk group not already contained in the scan list, then the new scan list entry is made by adding (408) the appropriate element. This comprises inserting the received talk group identifier into the talk group field of the scan list and the received reception-priority level into the receive-priority level field of the scan list. If the talk group in the scan list update was not already in the communication unit's scan list and no empty scan list entries are found, then a fault is flagged (409). This flag may be a bit set in the communication unit memory that might be subsequently transmitted, or it may also be an error message directed to a visual display device in the communication unit, so its user is aware of the event. In the latter case, the user might manually replace an existing scan list entry with the talk group sourcing the trigger event that started the scan list revision process.

When it is determined (406) that the command is not an add command, the opcode is compared (410) with the delete command. If the opcode is not a delete command, the command might be another type reserved for other uses beyond the scope of the present invention, in which case they are processed (413). If a delete command is received, the scan list is searched to determine (411) whether the received talk group element is in the list. If not, the message is assumed to contain other information necessary for further processing (413) according to a method outside the scope of the present invention. If the talk group identifier is found in the scan list, the entry is deleted (412) from the scan list. Deletion is accomplished by erasing the talk group and receive-priority elements in the scan list entry. Automatic deletion may be initiated by the communication controller in response, for example, to a trigger component indicating that there is no longer a situation active that requires assistance across talk group boundaries. Thus, the talk group originally requiring assistance might issue an "all clear" message of the data or speech type. Automatically deleting a scan list element when it isn't required improves the communication system's effectiveness, as the limited scan list entries are made available for those talk groups requiring assistance. Upon deletion of the appropriate element, or upon completion of the processing of another command, the communication unit continues to monitor the control channel, until the next wireless message is received (401).

Figure 5:
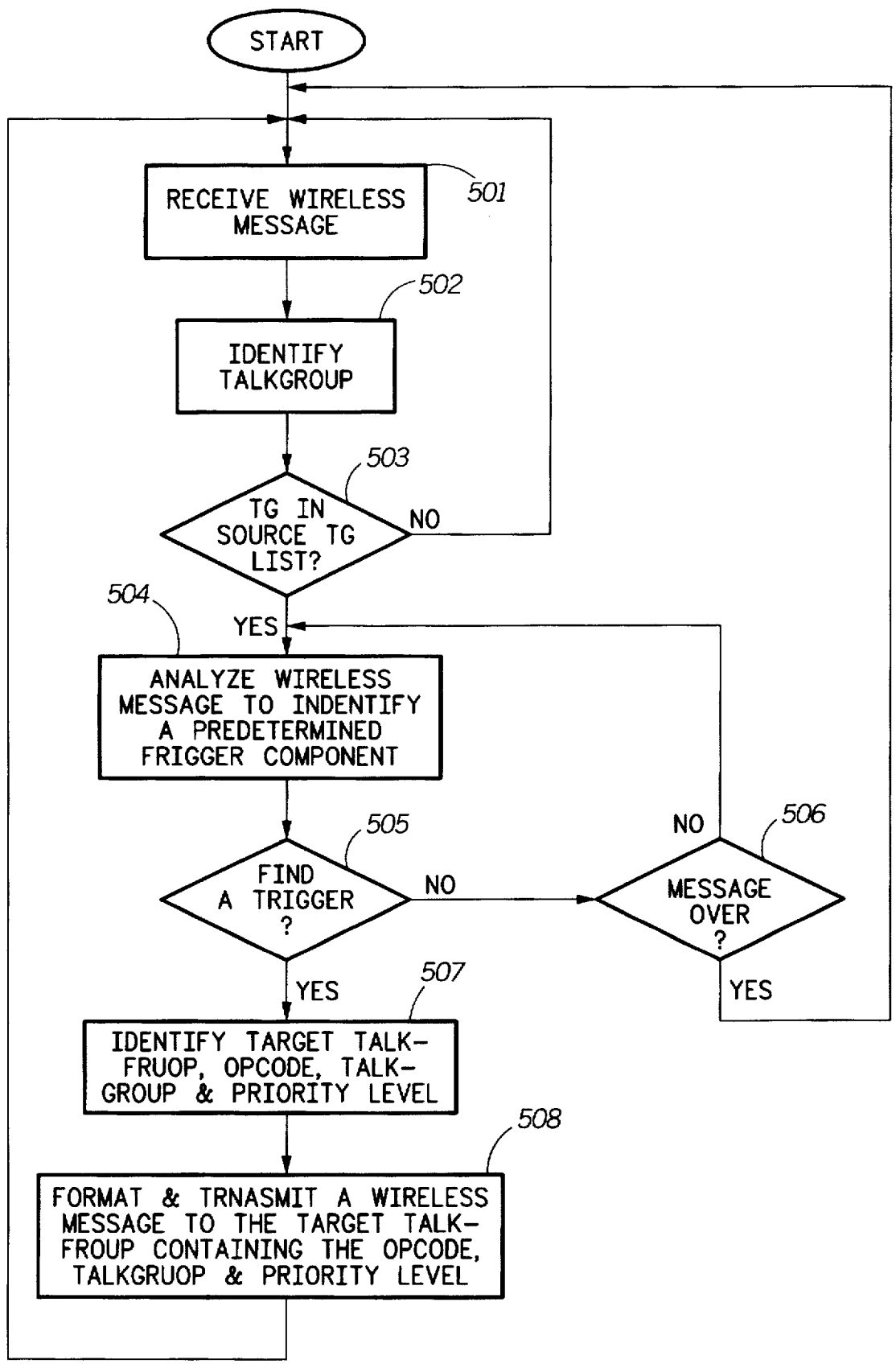
FIG. 5 illustrates a logic diagram depicting operation of a communication controller, in accordance with the present invention.

FIG. 5 illustrates a logic diagram depicting operation of the base site, in accordance with the present invention. Upon receipt (501) of a wireless message (i.e., message 118 shown in FIG. 1) from a communication unit, the communication controller identifies (502) which talk group the sourcing communication unit belongs to (i.e., from talk group field 119 shown in FIG. 1). The communication controller then determines (503) whether or not the identified talk group is represented in its source talk group field (i.e., field 301 in FIG. 3). If not, no special action is taken until the next wireless message is received (501). However, if the talk group is found in the talk group list, then the communication controller instructs the trigger detection system 111 to analyze (504) the message for the trigger component associated with the talk group entry. As earlier noted, the communication controller includes channel information in the same instruction, so the trigger detection system 111 can monitor the correct base station 107–109 for communication from the source communication unit. If the trigger component is not found (505), then a check for the end of the message is made (506). A message end identifier is well known in the art to include an end of transmission (EOT) signal. If the message is not over, the base site continues to analyze (504) the message, searching for the trigger component during the message.

When the message is over, the next wireless message is received (501) and processed as discussed above. When the trigger component is found within the message 120 from the source communication unit, the communication controller determines (507) the target talk group, scan list revision opcode, talk group identifier, and receive-priority level (i.e., based on the entry in table 300 for the sourcing talk group). The communication controller then formats a wireless message 114 for transmission, by the base stations 107–109, to the talk group indicated in the target talk group field 304 of the entry of table 300. The wireless message 114 contains the scan list revision opcode, talk group identifier, and receive-priority. Upon receipt of the wireless message 114, the target communication units automatically scan transmissions from the sourcing talk group using the receive-priority level associated therewith. After the message is transmitted (508), the base site continues to receive (501) wireless messages and processing them as discussed above.

In the foregoing manner, the present invention provides a method for automatically revising the scan list in a wireless communication unit in response to the detection of a predetermined trigger component. Thus, recipient communication units are made capable of scanning subsequent transmissions from a talk group requiring assistance during an emergency. Likewise, the present invention contemplates the deletion of certain talk groups from the scan list, thereby enabling the communication units to return to normal, efficient scanning operations. Further, such a method is not constrained by the shortcomings of prior art schemes that rely on human intervention for directing talk groups to monitor communications from another talk group requiring assistance.

What is claimed is:

1. A method comprising the steps of:
   receiving, at a base site, a wireless message from a source communication unit that includes a predetermined trigger component and an identification of a first talk group to which the source communication unit belongs,
   analyzing the wireless message to identify the predetermined trigger component; and
   transmitting a wireless message that includes a second talk group identifier and an instruction to cause recipient communication units to add the second talk group identifier to their scan lists,
   wherein the step of analyzing the wireless message to identify the predetermined trigger component includes the step of:
      when the wireless message includes a data component that includes information identifying a present location for the source communication unit, comparing the present location with predetermined location information.

2. The method of claim 1, wherein the step of transmitting a wireless message that includes a second talk group identifier includes the step of identifying the second talk group identifier as a function, at least in part, of the present location of the source communication unit.

3. In a wireless dispatch communication system having a base station controller and a trigger detection system coupled to a plurality of base sites facilitating dispatch communication among a plurality of communication units, wherein each communication unit has a scan list defining a set of talk groups with which it can presently communicate, a method of dynamically generating instructions to selected communication units to update their associated scan lists so as to authorize access thereof to a high priority talk group presently not defined in said associated scan lists, comprising the steps of:

detecting, by the trigger detection system, a trigger signal from a communication unit authorized access to the high priority talk group;

identifying, on the basis of at least the trigger signal, the selected communication units to be authorized access to the high priority talk group; and dynamically generating an instruction, by the base station controller, to the selected communication units to update said associated scan lists to add an identifier representative of said high priority talk group.

4. The method of claim 3, wherein said identifier comprises a talk group identification and a corresponding reception priority level.

5. The method of claim 3, wherein the trigger signal is part of a wireless message transmitted when the high priority talk group is active.

6. The method of claim 3, wherein the trigger signal is part of a wireless message which further comprises information identifying a present location of the communication unit transmitting the wireless message.

7. The method of claim 6, wherein the step of identifying the selected communication units is achieved on the basis of said present location information as well as said trigger signal.

8. The method of claim 3, wherein the trigger signal is a speech component of a wireless message, and wherein the step of analyzing the trigger signal involves comparing the speech component to predefined speech-based triggers.

9. The method of claim 8, wherein said speech component is a single word.

10. The method of claim 8, wherein said speech component is a multi-word phrase.

* * * * *